Patented June 22, 1954

2,681,912

UNITED STATES PATENT OFFICE 2,681,912

TETRAHYDROISOQUINOLINALKANOL ESTERS OF CYCLOALIPHATIC ACIDS AND DERIVATIVES THEREOF

John W. Cusic, Skokie, Ill., assignor to G. D. Searle & Co., Chicago, Ill., a corporation of Illinois No Drawing. Application October 29, 1951, Serial No. 253,750

8 Claims. (Cl. 260—287)

The present invention relates to a new group of heterocyclic organic compounds and, more particularly, to derivatives of 1,2,3,4-tetrahydroisoquinoline and their salts, which are substituted in the 2-position by a lower cycloalkanoylalkyl radical. Of special interest are the 1,2,3,4-tetrahydroisoquinoline derivatives which contain in the 2-position a cycloalkanoylalkyl radical of the type $$Cy—C_nH_{2n}—COO—C_mH_{2m}—$$

wherein Cy is a lower cycloalkyl radical containing 3 to 6 nuclear carbon atoms, $m$ is a whole number between 1 and 6 inclusive, and $n$ is a whole number between 0 and 6 inclusive.

In the foregoing structural formula Cy represents a lower cycloaliphatic hydrocarbon radical such as cyclopropyl, cyclobutyl, cyclopentyl, and cyclohexyl or a corresponding lower-alkyl substituted cycloalkyl radical such as methylcyclopentyl, ethylcyclohexyl, and the like.

The cycloalkanoylalkyl side-chain can be introduced into unsubstituted 1,2,3,4-tetrahydroisoquinolines as well as into the usual types of substituted isoquinolines containing nuclear substituents such as lower alkyl, lower alkoxy, lower alkylenedioxy, lower aralkyl, lower aryl, and lower aryloxy radicals.

The organic bases described herein form salts with a variety of inorganic and strong organic acids, including sulfuric, phosphoric, hydrochloric, hydrobromic, hydriodic, sulfamic, citric, lactic, maleic, malic, succinic, tartaric, cinnamic, acetic, benzoic, gluconic, oxalic, ascorbic, and related acids. They also form quaternary ammonium salts with a variety of organic esters of sulfuric, hydrohalic and aromatic sulfonic acids. Among such esters are methyl chloride, bromide and iodide; ethyl chloride, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide.

The esters which constitute the present invention are valuable as intermediates in organic synthesis. Their salts are of value as medicinal agents because of their effect on cardiovascular, renal, and nervous functions. They are of value as active ingredients in parasiticidal compositions of matter.

One of the most convenient ways of preparing the compounds of this invention is represented schematically as follows:

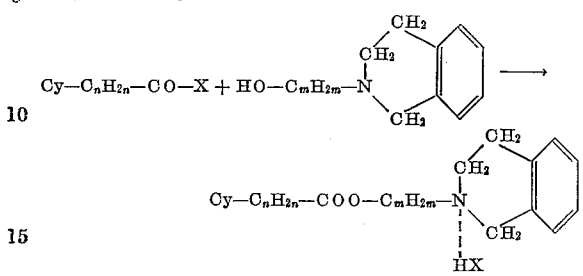

X being halogen and all other symbols being defined as hereinabove.

Another method consists in the direct introduction of the side-chain $$Cy—C_nH_{2n}—COO—C_mH_{2m}—$$

in the 2-position by heating the 1,2,3,4-tetrahydroisoquinoline with a halide of the type $$Cy—C_nH_{2n}—COO—C_mH_{2m}—X$$

all symbols being defined as hereinabove.

My invention is disclosed in further detail by the following examples which are set forth for the purpose of illustrating this invention, but are in no way to be construed as limiting it in spirit or in scope. It will be apparent to those skilled in the art of organic synthesis that many conventional modifications in methods, conditions and materials can be adopted without departing therefrom. In each of these examples quantities of materials are expressed as parts by weight, temperatures as degrees centigrade (° C.), and pressures during vacuum distillation as millimeters (mm.) of mercury.

EXAMPLE 1

*1,2,3,4-tetrahydroisoquinoline-2-ethanol cyclopentanecarboxylate hydrochloride*

On mixing of 132 parts of cyclopentanecarbonyl chloride and 177 parts of 1,2,3,4-tetrahydroisoquinoline-2-ethanol in 2600 parts of benzene, an oily precipitate separates which solidifies after heating at reflux temperature for one hour. After cooling, the reaction mixture is treated with ether and the solid precipitate collected on a filter and recrystallized from isopropanol, using charcoal as a decolorizing agent. The solid hydrochloride of 1,2,3,4-tetrahydroisoquinoline-2-ethanol cyclopentanecarboxylate thus obtained melts at about 171–172° C. It has the structural formula

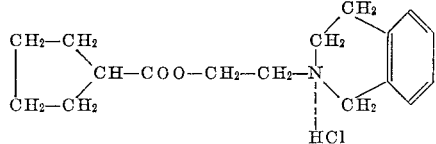

EXAMPLE 2

*1,2,3,4-tetrahydroisoquinoline-2-ethanol cyclohexanecarboxylate hydrochloride*

On mixing of 292 parts of cyclohexanecarbonyl chloride and 354 parts of 1,2,3,4-tetrahydroisoquinoline-2-ethanol in 2500 parts of butanone, a vigorous reaction occurs at once with formation of a solid precipitate. The reaction is completed by heating at reflux temperature for 5 hours. After cooling the precipitate is collected on a filter and recrystallized from isopropanol. The hydrochloride of 1,2,3,4-tetrahydroisoquinoline-2-ethanol cyclohexanecarboxylate thus obtained melts at about 161–163° C. and has the structural formula

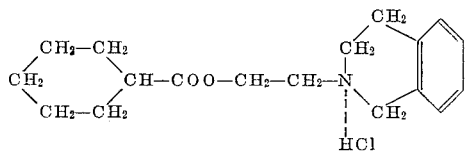

EXAMPLE 3

*1,2,3,4-tetrahydroisoquinoline-2-ethanol cyclohexaneacetate hydrochloride*

177 parts of 1,2,3,4-tetrahydroisoquinoline-2-ethanol are mixed with 160 parts of cyclohexaneacetyl chloride in 2500 parts of benzene. There occurs an immediate formation of a solid precipitate. The reaction is completed by heating at reflux temperature for one hour, after which the precipitate is collected on a filter and recrystallized from dilute isopropanol. The hydrochloride of 1,2,3,4-tetrahydroisoquinoline-2-ethanol cyclohexaneacetate thus obtained melts at about 211–212° C. and has the structural formula

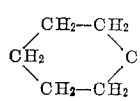

EXAMPLE 4

*1,2,3,4-tetrahydroisoquinoline-2-ethanol β-cyclohexanepropionate hydrochloride*

A mixture of 174 parts of β-cyclohexane propionyl chloride and 177 parts of 1,2,3,4-tetrahydroisoquinoline-2-ethanol in 2500 parts of benzene is heated at reflux temperature for two hours. After cooling the solid precipitate is collected on a filter and recrystallized from isopropanol. The hydrochloride of 1,2,3,4-tetrahydroisoquinoline - 2 - ethanol β - cyclohexanepropionate melts at about 206–207° C. and has the structural formula

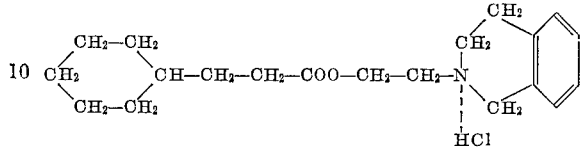

EXAMPLE 5

*1,2,3,4-tetrahydroisoquinoline-2-ethanol γ-cyclohexanebutyrate hydrochloride*

A mixture of 188 parts of γ-cyclohexanebutyryl chloride and 177 parts of 1,2,3,4-tetrahydroisoquinoline-2-ethanol in 2500 parts of benzene is heated at reflux temperature for 2 hours, cooled and filtered. The hydrochloride of 1,2,3,4-tetrahydroisoquinoline - 2 - ethanol γ - cyclohexanebutyrate thus collected on the filter is recrystallized from isopropanol. It melts at about 196–197° C. and has the structural formula

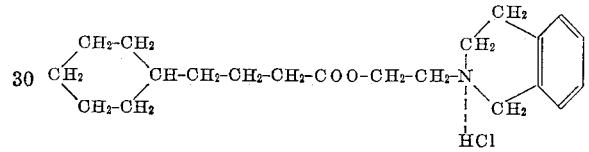

EXAMPLE 6

*1,2,3,4-tetrahydroisoquinoline-2-ethanol δ-cyclohexanevalerate hydrochloride*

A mixture of 202 parts of δ-cyclohexanevaleryl chloride and 177 parts of 1,2,3,4-tetrahydroisoquinoline-2-ethanol in 2500 parts of benzene is heated at reflux temperature for one hour. After cooling the solid precipitate is collected on a filter and recrystallized from isopropanol. The hydrochloride of 1,2,3,4-tetrahydroisoquinoline-2-ethanol δ-cyclohexanevalerate thus obtained melts at about 170–171° C. and has the structural formula

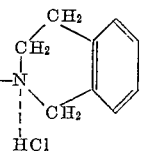

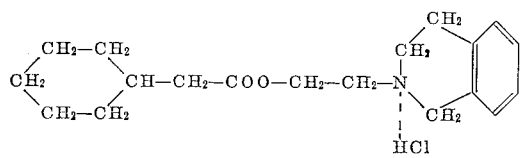

EXAMPLE 7

*1,2,3,4-tetrahydroisoquinoline-2-ethanol ω-cyclohexanecaproate hydrochloride*

A mixture of 216 parts of ω-cyclohexanecaproyl chloride and 177 parts of 1,2,3,4-tetrahydroisoquinoline-2-ethanol in 2500 parts of benzene is heated at reflux temperature for one hour. After cooling the solid precipitate is collected on a filter and recrystallized from isopropanol. The hydrochloride of 1,2,3,4-tetrahydroisoquinoline-2-ethanol ω-cyclohexanecaproate melts at about 167–168° C. and has the structural formula

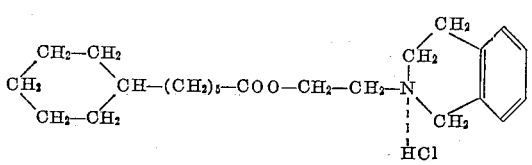

EXAMPLE 8

α,α - Dimethyl - 1,2,3,4 - tetrahydroisoquinoline-2-methanol dihydro-α-fencholenate A mixture of 188 parts of dihydro-α-fencholenyl chloride and 160 parts of α,α-dimethyl-1,2,3,4 - tetrahydroisoquinoline - 2 - methanol in 3000 parts of benzene is heated at reflux temperature for five hours and then concentrated and chilled. The precipitated hydrochloride is collected on a filter, dissolved in water, washed with ether, treated with an excess of dilute sodium hydroxide and extracted with ether. The ether extract is dried over anhydrous calcium sulfate, filtered and evaporated to yield the α,α-dimethyl - 1,2,3,4 - tetrahydroisoquinoline - 2-methanol dihydro-α-fencholenate as a yellowish, high boiling oil. It has the structural formula

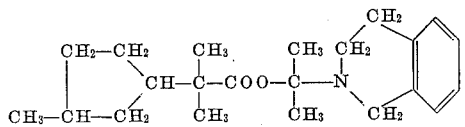

EXAMPLE 9

δ-Anhalonine-2-butanol cyclopropaneacetate 235 parts of the δ-bromobutyl ester of cyclopropaneacetic acid are added to a toluene solution of 440 parts of anhalonine and heated with stirring at reflux temperature for 24 hours. After cooling and treatment with ether, the reaction mixture is filtered and the filtrate is extracted with hydrochloric acid. The acidic extract is washed with ether, rendered alkaline, and extracted with ether. This ether extract is dried over anhydrous potassium carbonate, stirred with decolorizing charcoal, filtered and evaporated to yield a clear, high boiling, amber oil. The δ-anhalonine-2-butanol cyclopropaneacetate thus obtained has the structural formula

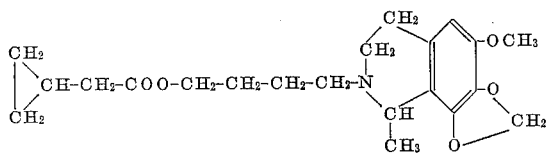

EXAMPLE 10

1 - phenyl - 3 - methyl - 1,2,3,4 - tetrahydroisoquinoline-2-ethanol cyclobutaneacetate A mixture of 265 parts of cyclobutaneacetyl chloride and 532 parts of 1-phenyl-3-methyl-1,2,3,4-tetrahydroisoquinoline-2-ethanol in 4000 parts of toluene is heated at reflux temperature for 6 hours and then concentrated and chilled. The precipitate is collected on a filter, dissolved in water, washed with ether, rendered alkaline by addition of ammonium hydroxide and extracted with ether. The resulting ether extract is dried over anhydrous calcium sulfate, stirred with decolorizing charcoal, filtered and evaporated to yield the 1-phenyl-3-methyl-1,2,3,4-tetrahydroisoquinoline - 2 - ethanol cyclobutaneacetate as a clear, high boiling, orange oil which has the structural formula

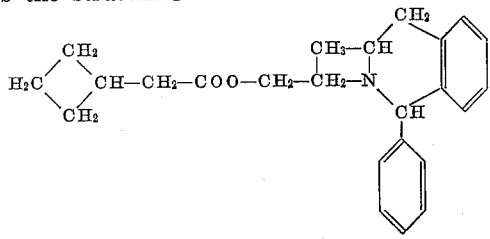

EXAMPLE 11

1,2,3,4 -tetrahydroisoquinoline - 2 - ethanol n-caproate

Upon mixing of 135 parts of n-caproyl chloride and 177 parts of 1,2,3,4-tetrahydroisoquinoline-2-ethanol in 1600 parts of butanone, there occurs formation of a solid precipitate. The reaction is completed by heating at reflux temperature for two hours after which ethanol is added to destroy any unreacted acid chloride. The mixture is cooled and the hydrochloride of 1,2,3,4-tetrahydroisoquinoline-2-ethanol n-caproate collected on a filter and recrystallized from isopropanol. It melts at about 176–177° C.

EXAMPLE 12

1,2,3,4 - tetrahydroisoquinoline - 2 - ethanol n-heptoate

On mixing of 250 parts of n-heptoyl chloride and 350 parts of 1,2,3,4-tetrahydroisoquinoline-2-ethanol in 2400 parts of butanone, there is formation of a heavy solid precipitate. After refluxing for two hours the mixture is treated with ethanol, and the hydrochloride of 1,2,3,4-tetrahydroisoquinoline-2-ethanol n-heptoate collected on a filter. Recrystallized from isopropanol using charcoal as a clarifying agent, it melts at about 174–175° C.

I claim:

1. A member of the class consisting of the esters of the structural formula

and salts thereof, wherein Cy is a lower cycloalkyl radical containing 3 to 6 nuclear carbon atoms inclusive, $m$ is a whole number between 1 and 6 inclusive, $n$ is a whole number between 0 and 6 inclusive, and Q is a member of the class consisting of the 2-(1,2,3,4-tetrahydro)isoquinolyl radical and 2-(1,2,3,4-tetrahydro)isoquinolyl radicals nuclearly substituted by a member of the class consisting of lower alkyl, lower alkoxy, methylenedioxy and phenyl radicals.

2. A 1,2,3,4 - tetrahydroisoquinoline - 2 - alkanol cycloalkanecarboxylate of the structural formula

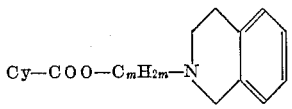

wherein Cy is a lower cycloalkyl radical containing 3 to 6 nuclear carbon atoms inclusive, and $m$ is a whole number between 1 and 6 inclusive.

3. 1,2,3,4-tetrahydroisoquinoline-2-ethanol cyclopentanecarboxylate.

4. 1,2,3,4-tetrahydroisoquinoline-2-ethanol cyclohexanecarboxylate.

5. A 1,2,3,4 - tetrahydroisoquinoline - 2 - alkanol cycloalkaneacetate of the structural formula

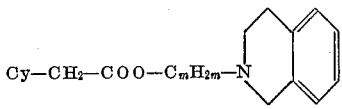

wherein Cy is a lower cycloalkyl radical containing 3 to 6 nuclear carbon atoms inclusive, and $m$ is a whole number between 1 and 6 inclusive.

6. A 1,2,3,4 - tetrahydroisoquinoline - 2 - alkanol cycloalkanepropionate of the structural formula

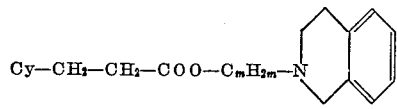

wherein Cy is a lower cycloalkyl radical containing 3 to 6 nuclear carbon atoms inclusive, and $m$ is a whole number between 1 and 6 inclusive.

7. An alkyl - 1,2,3,4 - tetrahydroisoquinoline-2-alkanol ester of the structural formula

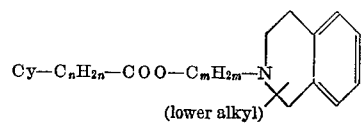

wherein Cy is a lower cycloalkyl radical containing 3 to 6 carbon atoms inclusive, $m$ is a whole number between 1 and 6 inclusive, and $n$ is a whole number between 0 and 6 inclusive.

8. An alkyl - 1,2,3,4 - tetrahydroisoquinoline-2-alkanol cycloalkaneacetate of the structural formula

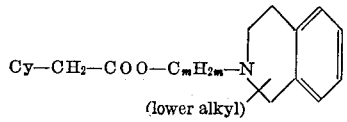

wherein Cy is a lower cycloalkyl radical containing 3 to 6 carbon atoms inclusive and $m$ is a whole number between 1 and 6 inclusive.

No references cited.